UNITED STATES PATENT OFFICE.

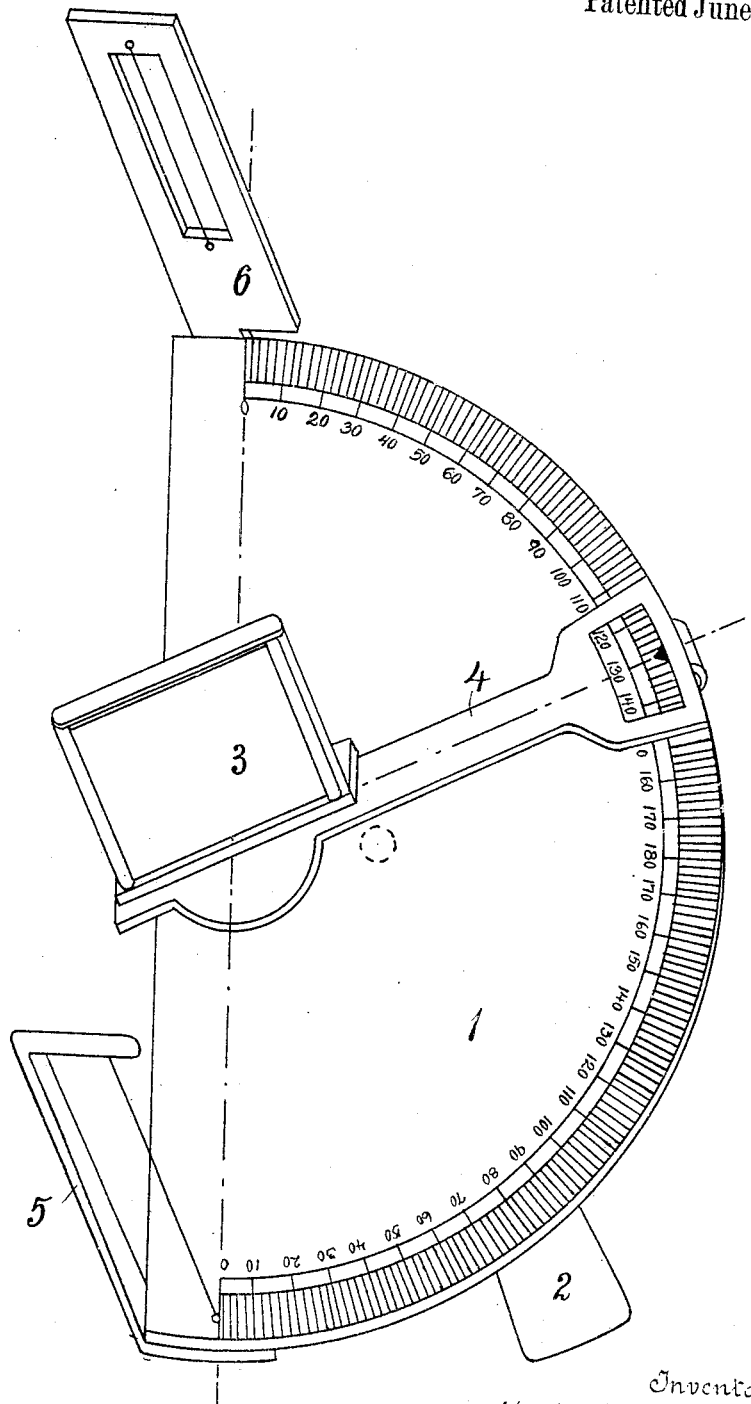

MARTIN AUGUST TÖNNESSEN, OF BERGEN, NORWAY.

INSTRUMENT FOR MEASURING ANGLES.

1,381,520. Specification of Letters Patent. Patented June 14, 1921.

Application filed October 31, 1918. Serial No. 260,525.

*To all whom it may concern:*

Be it known that I, MARTIN AUGUST TÖNNESSEN, a subject of the King of Norway, and a resident of Marineholmen, Bergen, in the Kingdom of Norway, have invented certain new and useful Improvements in Instruments for Measuring Angles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention has for its object an instrument for the measuring of angles and particularly with relation to coast navigation, said instrument permitting a quick and accurate determination of position by measuring angles to two different stationary points. Previously these measurements have mostly been taken by means of sextants and octants and similar instruments comprising two mirrors. Experience has however shown that horizontal measurements with such two mirror-instruments are very difficult particularly on high sea, and determination of position by measuring the angles to stationary points for this reason is not much used in navigation.

Instead of such measuring operations the position is usually determined by compass, but this form of measuring has the disadvantage that on small vessels the compass will practically never be quiet on high sea, and for this reason one can never be quite certain of the compass course in the moment of taking the observation. Determination of position by compass observation is therefore in most cases not to be trusted for smaller vessels, and on rough sea.

By means of the present instrument the measurement of angles is made simple and accurate, so that determination of position by means of compass may be avoided.

On the drawing is illustrated an embodiment of the invention by means of a perspective view of the same. As is apparent from the drawing the instrument comprises a graduated semi-circular disk 1, the underside of which is provided with a handle 2. A mirror 3 is mounted to pivot on a vertical trunnion in the center of the semicircle, said mirror 3 being provided with a radial arm 4, which carries an indicating needle, running on the semicircular scale. Sighting members or sights 5, 6 are mounted diametrically opposite across the zero-line of the semi-circular scale, the sighting wires of which are substantially perpendicular to the plane of the disk.

The instrument is used by sighting one of the stationary points through the sights 5, 6 above mirror 3 and turning the mirror arm 4 until the other stationary point is at the same time sighted in the mirror in the sighting line. The position of the angle between the arm and the sighting line is then just half of the angle between the sighting lines to the two stationary points.

In order to facilitate the reading of the sighting angle the scale may be provided with graduations indicating exactly the double of the real angle between each point of the scale and the zero-line.

It will be understood that the detail arrangement of the instrument may be varied, and the invention is not limited to the specific form, which is diagrammatically indicated on the drawing.

Claim.

In an instrument for measuring angles, the combination of a member provided with a semi-circular scale, each half of which is divided into graduations corresponding in number to the degrees in a semi-circle, the zero points of the scale lying on diametrically opposite points, a mirror pivotally mounted at the center of curvature of the scale, devices mounted on the member and provided with sighting lines lying perpendicular to the member at the zero points of the scale and extending above the mirror so that they may be sighted upon one of two points, the angle between which is to be measured, and means associated with the mirror for indicating on the scale the actual angle which is to be measured.

In testimony that I claim the foregoing as my invention, I have signed my name in presence of two subscribing witnesses.

MARTIN AUGUST TÖNNESSEN.

Witnesses:
 BORGHILD FLAK-TÖNNESSEN,
 H. WATHNE.